United States Patent
Rohatschek et al.

(10) Patent No.: US 9,529,746 B2
(45) Date of Patent: Dec. 27, 2016

(54) METHOD FOR OPERATING A COMMUNICATION SYSTEM

(71) Applicant: ROBERT BOSCH GMBH, Stuttgart (DE)

(72) Inventors: Andreas-Juergen Rohatschek, Wernau/Neckar (DE); Dieter Thoss, Schwieberdingen (DE); Thorsten Huck, Murr (DE); Stoyan Todorov, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 348 days.

(21) Appl. No.: 14/347,890

(22) PCT Filed: Sep. 19, 2012

(86) PCT No.: PCT/EP2012/068412
§ 371 (c)(1),
(2) Date: Mar. 27, 2014

(87) PCT Pub. No.: WO2013/045323
PCT Pub. Date: Apr. 4, 2013

(65) Prior Publication Data
US 2014/0317322 A1 Oct. 23, 2014

(30) Foreign Application Priority Data
Sep. 27, 2011 (DE) .................. 10 2011 083 474

(51) Int. Cl.
*G06F 13/26* (2006.01)
*H04L 12/423* (2006.01)

(52) U.S. Cl.
CPC ............. *G06F 13/26* (2013.01); *H04L 12/423* (2013.01)

(58) Field of Classification Search
None
See application file for complete search history.

(56) References Cited

U.S. PATENT DOCUMENTS 4,389,721 A    6/1983   Young et al.

FOREIGN PATENT DOCUMENTS

JP            10-254507          9/1998

OTHER PUBLICATIONS

International Search Report for PCT/EP2012/068412, issued on Dec. 12, 2012.

*Primary Examiner* — Zachary K Huson
*Assistant Examiner* — Dayton Lewis-Taylor
(74) *Attorney, Agent, or Firm* — Norton Rose Fulbright US LLP; Gerard Messina

(57) ABSTRACT

A method for transmitting frames containing data between users of a ring-shaped communication system which has a master and at least one slave as users. Each user has at least one interrupt register, and one field of the at least one interrupt register is associated with an interrupt request and includes a value for an interrupt bit. An interrupt request which includes the interrupt bit is transmitted to the master by a slave in a frame designed as an empty frame. In addition, the empty frame has a toggle bit for all slaves which indicates the state of an interrupt request.

9 Claims, 3 Drawing Sheets

METHOD FOR OPERATING A COMMUNICATION SYSTEM

FIELD OF THE INVENTION

The present invention relates to a method for operating a communication system, and a communication system.

BACKGROUND INFORMATION

In the automotive engineering sector, serial interfaces such as serial peripheral interfaces (SPI) may be used in control units for transmitting data between logic units which may be designed as integrated circuits (IC), for example. An SPI interface describes a bidirectional, synchronous, serial data transmission between a unit designed as a master and various units designed as slaves. An interface includes at least three lines between the master and a slave, generally two data lines and one clock line. For multiple slaves, each of these units requires an additional select line from the master. The SPI interface allows the setup of a daisy chain or bus topology.

In some cases, the SPI interface is not suited for transmitting time-critical control signals in order to meet real-time requirements of present security-critical applications. Frequently, only diagnostic and status information is exchanged using an SPI. Time-critical control signals are generally transmitted with a high level of complexity to the control units of the actuators and/or from the evaluation circuits of the sensors, utilizing timer units and/or proprietary interfaces.

In the use of the SPI interface in the form of a bus topology, increasingly impaired signal integrity and a high level of interfering influences result at higher data rates due to poor EMC properties. In addition, only the transmission signal is synchronously transmitted with the clock signal, whereas the phase-synchronous transmission of the reception signal becomes increasingly difficult due to the internal delay times in the slave at high data rates. Thus, when the SPI interface is used in a daisy chain topology, i.e., in a ring topology, very high latencies may result, for which reason a communication system of this type cannot be efficiently utilized in automotive control units.

A so-called three-way handshake method is used in the related art, based on a physical transmission layer such as an SPI for loss-free data transmission between two entities. During the transport of messages, the participating entities require the option of ensuring that the entity which they have contacted has received the message. A transmitting entity would thus desire an acknowledgment response when the message has arrived. Thus, a first user sends a message to a second user. Based on a ring topology, the transmitting first user, for example the master, may now read back its sent message and determine by comparison whether a transmission error has occurred; however, the first user cannot make a distinction between whether the original message has arrived at the second user with distortion already present, or whether the message arrived correctly at the second user and has been distorted on the return path. In addition, the second user, for example the slave, must be sure that its message, for example the acknowledgment, has been correctly transmitted to the first user in order to subsequently be able to occupy the memory space with new data, for example.

SUMMARY

By use of the present invention, among other things a protocol and a data structure for a method for transmitting data between users in a communication system are provided, the users being connected to one another in series, and the communication system having a customary ring-shaped structure in a ring topology. In one embodiment it is provided that transmission of the data is secured by specialized segments in the transmission protocol and/or in the data structure. Interrupt bits in interrupt registers of the users and toggle bits in interrupt requests are used as segments of this type. One interrupt bit is assigned to each slave, the particular slave signaling to the master whether or not this slave is able to provide data to the master by setting the interrupt bit assigned to it in an empty frame. If the slave is able to provide data to the master, via the set interrupt bit the slave requests the master to send it a data frame into which the slave may insert the data. Each frame, which may be designed as an empty frame or a data frame, has a toggle bit for all users. A value of the toggle bit indicates whether a transmission of the preceding frame has taken place without interference or whether it has not, i.e., it must be repeated.

In this way, a simple and cost-effective implementation of users may take place up to high data rates on logic units of the communication system having, for example, at least one microcontroller of at least one application-specific integrated circuit (ASIC). The method allows error-free transmission of data between the users for use in security-critical applications.

In one possible application, safeguards on the part of the software which are usually necessary are minimized. The need for an interaction between a computer core and an interface module of a user, which may be designed as a serial interface, may thus be reduced. Accordingly, the communication system facilitates a secure transmission of messages between users, one user of the communication system being designed as the master, and at least one further user being designed as the slave. In the event of a transmission error, in one embodiment of the present invention an autonomous repetition of a data request may take place without interaction with the software. In addition, the described communication system allows synchronization of the connected users on a uniform time domain, and facilitates instructions for the singlecast, multicast, or broadcast transmission of data, as a result of which the master may address multiple slaves simultaneously.

In the communication system having a ring topology, the users are connected by point-to-point connections having the least number of pins. One of the users, a microcontroller, for example, acts as the master, so that no bus arbitration is necessary. The slaves may have different designs. Thus, a discrete unit may have multiple slaves or only one slave. Discrete units, each having at least one slave, may be designed as application-specific integrated circuits (ASICs), it being possible for at least one unit into which at least one slave is integrated to be controlled by a logic circuit, for example a microcontroller or some other ASIC, as the master. The master generally sends a continuous data stream which passes through the slaves in succession. Due to the option for continuous synchronization, the slaves also require no further clock pulse. In one embodiment of the present invention, a uniform protocol having an associated data structure is provided to allow data exchange among the users.

In another embodiment of the present invention, transmission of data between users of a serial ring-shaped communication system, for example a so-called ring bus, is possible in which the users are connected to one another in series. In the process, a data packet may be transmitted from one user which is designed as the master to further users which are designed as slaves, the data packet being transmitted from slave to slave. In addition, data transmission may take place from user to user with a delay having a duration of at least one bit, as the result of which data packets which may contain the messages may be transmitted between the users with very low latency.

The communication system according to the present invention is designed to carry out all steps of the presented method. Individual steps of this method may also be carried out by individual components of the communication system. In addition, functions of the communication system or functions of individual components of the communication system may be implemented as steps of the method. Furthermore, it is possible for steps of the method to be implemented as functions of at least one component of the communication system or of the overall communication system.

Further advantages and embodiments of the present invention result from the description and the appended drawings.

It is understood that the features stated above and to be explained below may be used not only in the particular stated combination, but also in other combinations or alone without departing from the scope of the present invention.

Further advantages and embodiments of the present invention result from the description and the appended drawings.

It is understood that the features stated above and to be explained below may be used not only in the particular stated combination, but also in other combinations or alone without departing from the scope of the present invention.

DETAILED DESCRIPTION

Figure 1:
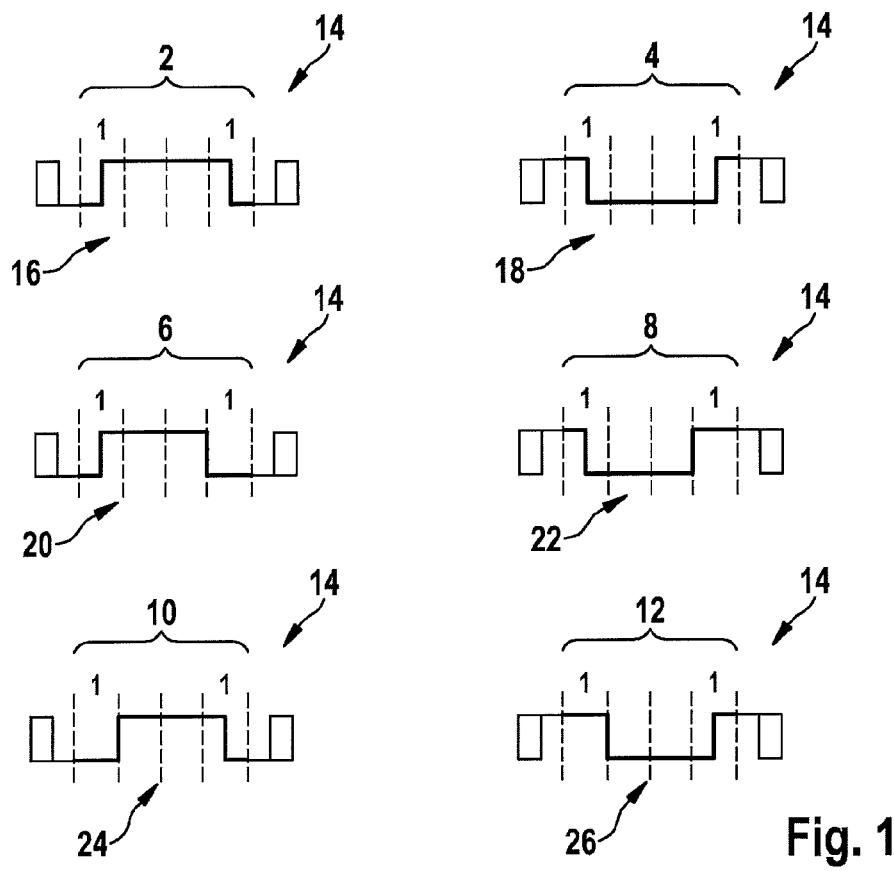
FIG. 1 shows a schematic illustration of examples of interframe symbols with Miller/MFM encoding, which are used in one specific embodiment of a method according to the present invention.

FIG. 1 shows examples of interframe symbols 2, 4, 6, 8, 10, 12 which are used as components of data packets that are transmitted between users of a communication system according to the present invention in one embodiment of the method according to the present invention. In a data packet of this type, one of the shown interframe symbols 2, 4, 6, 8, 10, 12 is followed by a frame 14, which may be designed either as a data frame or an empty frame.

In the case of MFM encoding and thus Miller encoding, which is used in one embodiment of the method according to the present invention for encoding data packets, this results, for instance, in the examples of interframe symbols 2, 4, 6, 8, 10, 12 for data packets of a data stream, illustrated in FIG. 1. Each interframe symbol 2, 4, 6, 8, 10, 12 has a characteristic signal pattern 16, 18, 20, 22, 24, 26, respectively, having an associated period duration. Signal pattern 16, 18, 20, 22, 24, 26 of each interframe symbol 2, 4, 6, 8, 10, 12, respectively, has, due to the Miller encoding, an impermissible period duration of 2.5 or 3 bits used during an initialization of the users and which differs from a customary period duration used for sending data. Signal patterns 16, 18 of the two first interframe symbols 2, 4, respectively, have a period duration of 3 bits, whereas signal patterns 20, 22, 24, 26 of further interframe symbols 6, 8, 10, 12, respectively, in each case have a period duration of 2.5 bits. Intermediate frame symbols 2, 4, 6, 8, 10, 12 having impermissible period durations are generated by an encoding violation. Interframe symbols 2, 4, 6, 8, 10, 12 correspond to invalid data signals which, however, are recognized by the users.

Due to the repeated transmission of this type of interframe symbol 2, 4, 6, 8, 10, 12 during the initialization, each slave in the communication system receives a sequence of alternating short and long period durations between two successive edge changes, which are defined by signal patterns 16, 18, 20, 22, 24, 26.

An interframe symbol (IFS) 2, 4, 6, 8, 10, 12, which functionally corresponds to a start of package and/or an end of package of a data packet, is inserted into the data stream to be transmitted, so that the messages from the users may be recognized in the continuous data stream and extracted. An interframe symbol (IFS) 2, 4, 6, 8, 10, 12 may also be designed as a preamble, so that the users designed as slaves may be synchronized with the subsequent messages. Interframe symbol 2, 4, 6, 8, 10, 12 is thus used for synchronizing frames which may be designed as data frames or empty frames.

To ensure that an interframe symbol 2, 4, 6, 8, 10, 12 is reliably recognized, the occurrence of an identical bit sequence in the data stream is excluded. This may be ensured, for example, by suitable encoding or an encoding violation. To generate a particular interframe symbol 2, 4, 6, 8, 10, 12 which may be used as a synchronization symbol, the rules of applied line encoding, for example Miller encoding, which always provides an edge change after a certain number of zeroes or ones in the data stream, may be utilized. Depending on how the method is carried out, if a minimum or maximum time period without edge changes is exceeded in the data stream, an invalid encoding is provided. Since the broadband requirements of the communication system are increased when the period duration falls below the minimum period duration without edge changes, as an alternative an invalid increase in the maximum permissible period duration without edge changes is selected.

Figure 2:
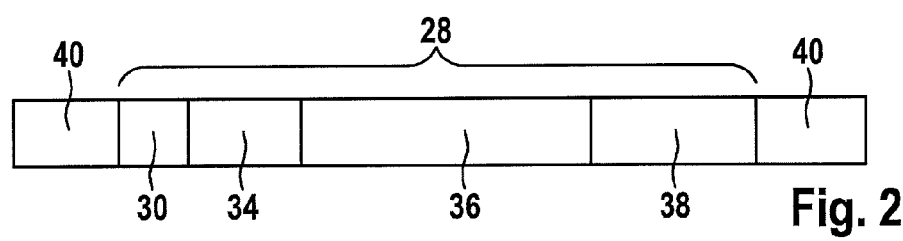
FIG. 2 shows a schematic illustration of a structure of a frame, designed as a data frame, which is used in another specific embodiment of the method according to the present invention.

FIG. 2 shows a schematic illustration of one example of the design of a frame of a data packet, designed as a data frame 28, which may be sent between users of a communication system according to the present invention. This data frame 28 includes an identity field 30, an address field 34, a data field 36, and an optional CRC field 38 for a cyclic redundancy check. In addition, FIG. 2 shows an interframe symbol 40 immediately before as well as immediately after data frame 28.

Figure 3:
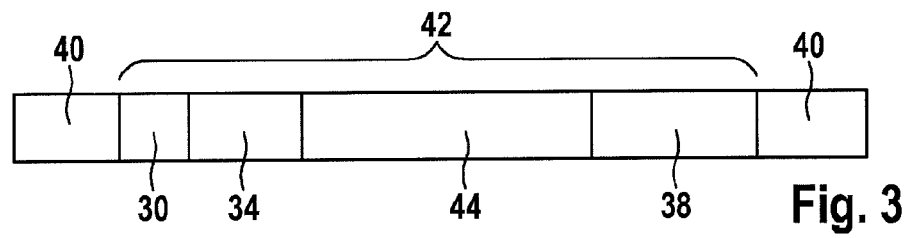
FIG. 3 shows a schematic illustration of a structure of a frame, designed as an empty frame, which is used in another specific embodiment of the method according to the present invention.

FIG. 3 schematically illustrates one example of a structure of a frame, designed as an empty frame 42, which in one specific embodiment of the method according to the present invention may be exchanged between users of a communication system according to the present invention. This empty frame 42 likewise includes an identity field 30 and an address field 34, which is optional in empty frame 42 and not absolutely necessary. In addition, empty frame 42 includes an IRQ field 44 for an interrupt request (IRQ). Empty frame 42 may likewise have an optional CRC field 38 for a cyclic redundancy check. Empty frame 42 is also situated between two interframe symbols 40 immediately before and immediately after empty frame 42 in a transmitted data stream.

Corresponding to the data structure of the frames presented in FIGS. 2 and 3, an interframe symbol 40 is followed by identity field 30 having a sequence of frame identity bits (frame ID bits) which signal to the user the type of message in the subsequent data stream. In one example of a configuration, in each case one frame identity bit and four address bits may be provided. An increase or decrease in the bits in a header, which includes identity field 30 and address field 34, is also possible in alternative embodiments.

In one embodiment of the present invention, address field 34 and identity field 30 of the frame of a data packet are provided with a parity bit, thus preventing incorrect addressing. Alternatively or additionally, a cyclic redundancy check (CRC) may be carried out and a check sum computed over the entire frame, usually the entire data frame. Computing the check sum over the complete frame facilitates the identification of a transmission error, and thus also allows use in a security-critical device, for example in a control unit of a motor vehicle.

In another application, the identity bits in an identity field 30 of a frame are configured by the master in such a way that the connected slaves may interpret the message as a data frame 28. In one example of a configuration, a data frame 28 is characterized in that a first identity bit FD0 in identity field 30 of data frame 28 is not set: FD0=0. Thus, the data content of the message may be processed only by the addressed user. This type of message (data frame 28) corresponds to the data content of a serial peripheral interface (SPI).

In addition to identity field 30 containing the identity bits, a frame has address fields 34 containing address bits. Addressing of a user may be carried out by setting and/or changing an address value and thus the address bit in address field 34, thus setting a piece of address information in address field 34 of the frame. During the addressing of a user, the ring topology is utilized in such a way that each user, usually a slave, subtracts 0x01 from a present address which is defined by the address value, for example, as the result of which the desired user is addressed with address 0x00 having a corresponding address value. The implementation usually takes place using a 1-bit subtractor by transmitting the address of a first least significant bit (LSB).

In addition, the further identity bits in identity field 30 of the frame may be utilized, for example, for transmission instructions (singlecast, multicast, and/or broadcast instructions). As the result of an appropriate configuration, writing (broadcast write) and/or reading (broadcast read) may be carried out during the transmission of a data frame 28. In the case of such a transmission instruction for writing and/or reading, a subsequent address value is no longer interpreted as address information, but, rather, as a broadcast identity (broadcast ID), and is not changed by the slaves. As a result, numerous different transmissions (broadcasts) of addresses, for example 16 addresses in the case of an address header having a length of 4 bits, may be carried out.

In a first application of a transmission (broadcast application), the master as a user sends, for example, an instruction for setting the system clocks to the slaves taking part in the communication, in addition to an individual offset which corresponds to the delay in the ring-shaped communication system and which is known to the master. Otherwise, the master may send multiple slaves a single frame having a known time offset. A time offset from the master to a first slave is x bits+ the number of data bits, since the slave cannot set its clock until after it has received the entire frame. However, this time is fixed and computable. Slaves following in succession set their clocks only with a further time offset and thus only with a further clock offset, since in one embodiment of the present invention the delay for each user is only one bit.

In a second application of a transmission, the master sends an instruction for outputting/setting the angle clocks of the connected slaves. In one example application, the first slave in the ring-shaped network system recognizes a transmission instruction for outputting its value of the angle clock. The first slave changes the identity stored in identity field 30 of the frame, which is usually designed as a data frame 28, by an identity stored in the identity bit, in such a way that the subsequent slaves have read access to the data content, and fill the data portion of the frame left empty by the master with the value of the angle clock. The subsequent slaves now make use of this transmission similarly as for the first application for setting the values of their angle clocks, taking the clock offset by one bit into account. If in addition an instantaneous change rate is transmitted, it being taken into account that a frame may have any arbitrary length, the slaves may be maintained with precise angular synchronism.

In one embodiment of the present invention, it is provided that each IRQ field 44 of an empty frame 42 has an interrupt bit for each participating slave, the interrupt bit being uniquely assigned to each slave. By setting and/or adjusting the interrupt bit assigned to it to either 1 or 0, each slave may transmit an interrupt request to the master, thus signaling that the master is to take a special action, for example sending this slave a data frame 28 into which the slave may insert data for the master.

Figure 4:
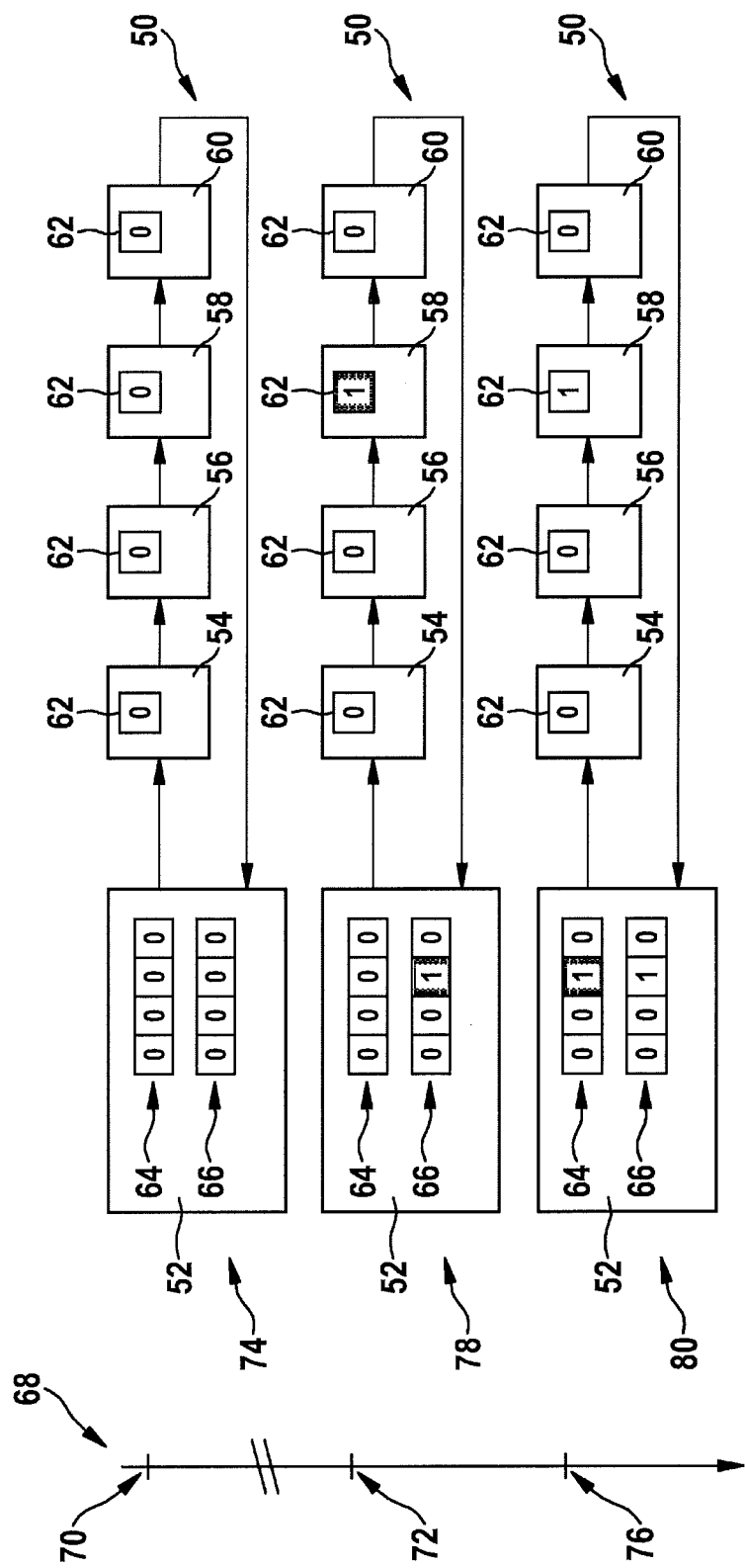
FIG. 4 shows a schematic illustration of one specific embodiment of the communication system according to the present invention, via which in one specific embodiment of the method according to the present invention a soft interrupt request is triggered.

FIG. 4 illustrates one example of triggering and resetting an interrupt request in one possible embodiment of the method according to the present invention.

FIG. 4 shows a schematic illustration of one example of a communication system 50 according to the present invention in three chronologically successive operating situations in one specific embodiment of the method according to the present invention. Communication system 50, which in the present case is ring-shaped, has a master 52 and slaves 54, 56, 58, 60 as users, which are connected to one another in communication system 50 in series and in a ring shape. A first slave 54 is connected to master 52 via a data connection. All slaves 54, 56, 58, 60 are connected in series and likewise connected to one another via data connections. A last slave 60 in the communication system is in turn connected to master 52.

For each slave 54, 56, 58, 60, FIG. 4 also illustrates an interrupt register 62 having a field that indicates a state of an interrupt bit, and thus of a bit for an interrupt request which has either state 0 or 1. Master 52 includes two interrupt registers 64, 66, each of these two interrupt registers 64, 66 of master 52 having y fields, a value of an xth field of an interrupt register 64, 66 being associated with a value and/or a state of an interrupt of an xth slave 54, 56, 58, 60. A first interrupt register 64 of master 52 indicates the data content of an interrupt bit of a preceding k−1th empty frame. A second interrupt register 66 indicates the data content of an instantaneous interrupt bit of a kth empty frame.

A time axis 68 likewise illustrated in FIG. 4 is subdivided into three areas, a first area being delimited by a first point in time 70 t=0, and a second point in time 72 at which an nth empty frame is sent by master 52 to slaves 54, 56, 58, 60, an initialization 74 of communication system 50 being carried out between these two points in time 70, 72. A second area which is delimited by second point in time 72 and a third point in time 76 at which an n+1th empty frame is sent by master 52 to slaves 54, 56, 58, 60 characterizes a triggering 78 of an interrupt. A reset 80 of the interrupt is carried out after third point in time 76. During the reset 80 of the interrupt and thus of the interrupt request, the interrupt bit in an interrupt register 62 of one of slaves 54, 56, 58, 60 is not reset; instead, a value of an xth field for an interrupt of second interrupt register 66 is accepted into first interrupt register 64 of master 52. The value of the interrupt bit in interrupt register 62 of slave 54, 56, 58, 60 thus remains unchanged. If slave 54, 56, 58, 60 would now like to transmit a new interrupt request to master 52, the state of the interrupt bit in interrupt register 62 of slave 54, 56, 58, 60 is inverted, which master 52 recognizes after the transmission by an empty frame by comparing first interrupt register 64 to second interrupt register 66 corresponding to the above-described method.

During initialization 74 of communication system 50, it is provided in the described specific embodiment of the present invention that all interrupt bits are set to 0 for all slaves 54, 56, 58, 60. During triggering 78 of the interrupt, it is provided here that a third slave 58 marks triggering 78 of the interrupt by switching the interrupt bit in its interrupt register 62, which in turn is registered by master 52 after receiving the interrupt fields of individual slaves 54, 56, 58, 60 in second interrupt register 66 of the master, in that a value in the third field of this second interrupt register 66 is set to 1, and the values of the other fields are 0.

Alternatively, it is possible for the interrupt bits to be set to 1 during initialization 74, and for a slave 54, 56, 58, 60 to set the value of the interrupt bit assigned to it to 0, provided that this slave 54, 56, 58, 60 is able to provide data to master 52. By suitably setting and/or adjusting the interrupt bit, which, depending on the definition, may mean that the interrupt bit is set and/or adjusted to 0 or 1, a slave 54, 56, 58, 60 may transmit a signal to the master.

In the event that one of slaves 54, 56, 58, 60 provides an interrupt request, the particular slave 54, 56, 58, 60 triggers the interrupt request by setting the value of the interrupt bit in its interrupt register 62. In addition, the instantaneous value of the interrupt bit, regardless of whether or not the particular slave 54, 56, 58, 60 now triggers an interrupt request, is transmitted into a frame, usually an empty frame, which is transmitted in communication system 50 from user to user, i.e., starting from master 52 and going from slave 54, 56, 58, 60 to slave 54, 56, 58, 60 and ultimately back to master 52. Each frame generally has x fields, an xth field being uniquely assigned a value of an interrupt bit of an xth slave 54, 56, 58, 60. As soon as master 52 has again received the frame after it has cycled from slave 54, 56, 58, 60 to slave 54, 56, 58, 60, the fields of first interrupt register 64 of master 52 may be updated, a value of the interrupt bit being transmitted from the xth field of the received frame into the xth field of first interrupt register 64 of master 52, which is provided as a reference.

In another application, the identity bits of a frame are configured by master 52 in such a way that connected slaves 54, 56, 58, 60 may interpret the frame, received as a message, as an empty frame. In one example of a configuration, an empty frame is characterized in that at least first identity bit FD0 in the identity field is appropriately set and thus defined, first identity bit being set to FD0=1, for example. A definition of a frame as an empty frame is to be made corresponding to a protocol that is used, an empty frame being defined as such by setting the fields and/or bits of a frame provided for this purpose. An empty frame is used to synchronize the users in the idle state of communication system 50, but also to be able to transmit interrupt requests, so-called soft interrupts, from slaves 54, 56, 58, 60 to master 52. Via this type of interrupt request, a slave 54, 56, 58, 60 may signal to master 52 a new data packet, for example, which master 52 may pick up with a read request. In a frame which may be designed as a data frame or empty frame, each slave 54, 56, 58, 60 is permanently assigned at least one interrupt bit which may be modified by the slave. The prioritization of the processing of the interrupt requests may now be carried out by master 52, for example a microcontroller.

In one protocol that is used, it is provided that an interrupt request (soft interrupt) of a slave 54, 56, 58, 60 is correctly responded to in the event of overlapping addressing by master 52; i.e., master 52 addresses slave 54, 56, 58, 60 even before the interrupt request of slave 54, 56, 58, 60 is processed and/or reset. For example, after the interrupt request has been successfully processed by master 52, a reset instruction may be transmitted to slave 54, 56, 58, 60; however, due to the latency of communication system 50 this reset instruction may only be carried out in slave 54, 56, 58, 60 at a point in time after which a new interrupt request is already present. It is thus possible for the interrupt requests still occurring in the time period after the receipt of the last empty frame until carrying out the reset instruction for the interrupt request to be inadvertently erased in slave 54, 56, 58, 60.

To prevent this, in one embodiment of the described communication system a unidirectional transmission of information for an interrupt request is provided. In this embodiment, each slave 54, 56, 58, 60 has interrupt register 62, and thus a register for interrupt requests. A value of interrupt register 62 in slave 54, 56, 58, 60 is inverted upon occurrence and/or triggering 78 of an interrupt request. An instantaneous status of interrupt register 60 is inserted by each user into the empty frame and transmitted to master 52. Master 52 already contains and/or includes a map of the status information of an interrupt register 64 from the preceding cycle, and by comparing the instantaneous status to the prior status of interrupt bits for interrupt requests, may now decide which of at least one user provided as a slave 54, 56, 58, 60 should be processed when a soft interrupt service routine, and thus a program for providing an interrupt request, is to be carried out, the at least one slave 54, 56, 58, 60 possibly being processed according to its assigned priority.

Figure 5:
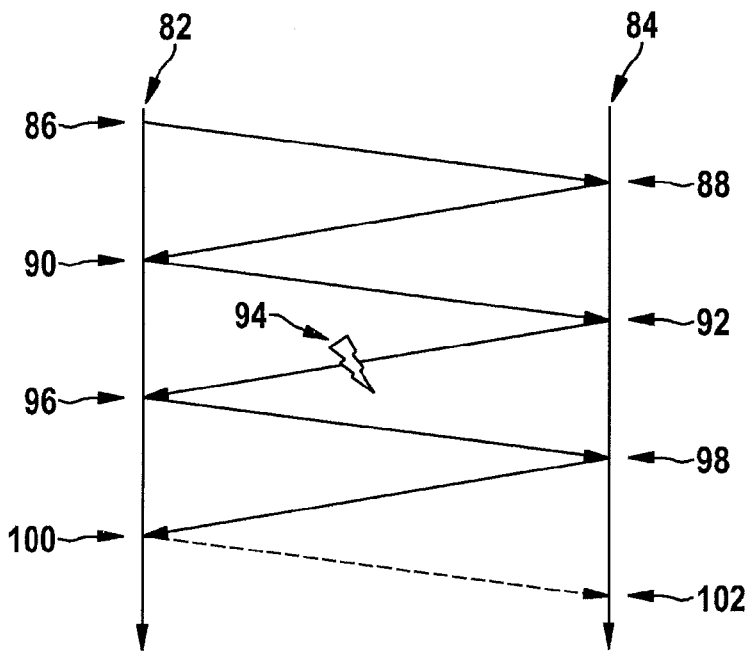
FIG. 5 shows a schematic illustration of one example of a sequence control for the secure transmission of an interrupt request when another specific embodiment of the method according to the present invention is carried out.

For another specific embodiment of the method according to the present invention, FIG. 5 shows a diagram having a first time axis 82 for a master and a second time axis 84 for a slave, whereby along these two time axes 82, 84 events are documented which take place during a sequence control for secure transmission of an interrupt request, and thus a request for an interrupt request.

The master sends an empty frame to at least one slave at a first point in time 86, and the at least one slave sets an interrupt at a second point in time 88, provided that new data are present in the slave. If the at least one slave sends an interrupt to the master, the interrupt is received at a third point in time 90, and the master carries out processing of this interrupt. In addition, the master transmits to the at least one slave a first read instruction and/or write instruction, which is received by the at least one slave at a fourth point in time 92, the at least one slave also reading out a register content, for example via a time stamp.

Upon a subsequent response by at least one slave to the master, it is now provided that an interference 94 in the communication takes place. This interference 94 results in a transmission error in the data stream. However, this transmission error is detected by the master at a fifth point in time 96 by evaluating a cyclic redundancy check (CRC). On this basis, the read instruction is repeated, whereupon the master sends to the at least one slave a second read instruction and/or write instruction, which is received by the at least one slave at a sixth point in time 98. In addition, the at least one slave repeats the preceding (first) read instruction and/or write instruction. The at least one slave subsequently transmits data to the master, which are received by the master at a seventh point in time 100. After the data are received, they are transferred into a memory, for example a RAM, of the master. The master may subsequently resend an empty frame to the at least one slave, which the at least one slave receives at an eighth point in time 102.

Figure 6:
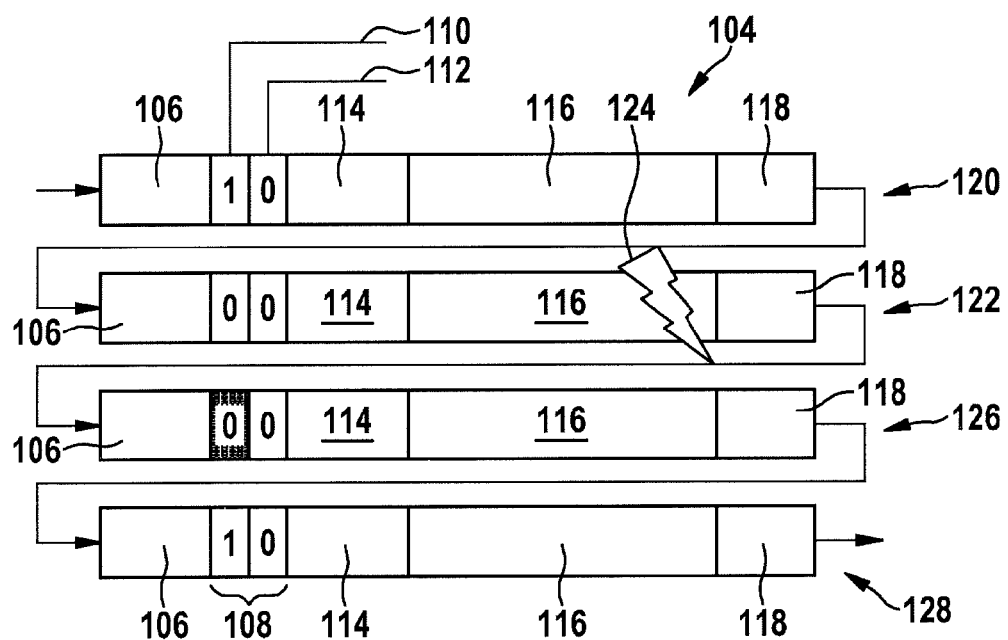
FIG. 6 shows a schematic illustration of one example of use of a toggle bit for autonomously retransmitting messages when another specific embodiment of the method according to the present invention is carried out.

FIG. 6 shows a schematic illustration of one example of a frame, in the present case designed as a data frame 104, in a data stream between users of a communication system according to the present invention in a variation over time of one specific embodiment of the method according to the present invention. This data frame 104 is preceded by an interframe symbol 106. In addition, data frame 104 includes an identity field 108, which in the present case has a toggle bit 110 and an identity bit 112 as well as an address field 114, a data field 116, and a CRC field 118 for a cyclic redundancy check.

Each frame, regardless of whether it is designed as a data frame 104 or as an empty frame, usually has a toggle bit, and thus a toggle bit for all users, generally all slaves. A value of the toggle bit signals whether a transmission of the frame has been correctly carried out, or whether interference, and thus an error, has occurred in the preceding cycle of a data frame or empty frame. Data field 116 also has interrupt bits, one interrupt bit being uniquely assigned to each slave.

It is provided that identity bit 112 of data frame 104 illustrated here has the value 0 at all points in time, which identifies the frame as a data frame 104. Alternatively, if the identity bit had the value 1, the frame would be an empty frame. A first transmission of a k−1th message in data field 116 takes place at a first point in time 120, it being further provided that toggle bit 110 has the value 1. Toggle bit 110 is switched to the value 0 and a first transmission of kth message in data field 116 is carried out at a second point in time 122. However, a transmission error 124 occurs here during the first transmission after second point in time 122. As a result, toggle bit 110 is not inverted by the master at a subsequent third point in time 126, so that in the present example the value 0 is maintained. As a result, the slave also repeats the preceding message, in the present case the kth message, so that this kth message is transmitted for a second time. However, it must be taken into account that a number of repeat attempts may be limited. Toggle bit 110 is once again inverted to 1, and a k+1th message is transmitted in data field 116 for the first time, at a fourth point in time 128.

In one design of the communication system in which, among other things, the speed at which different functions and therefore programs and/or instructions, for example, are carried out and/or implemented by users of the communication system may be taken into account, it is further provided that the occurrence of interrupt requests in a slave takes place more slowly than when these are picked up by an empty frame. Otherwise, the starting state is re-established by toggling, i.e., switching back and forth, the interrupt register twice, as the result of which the interrupt register cannot be identified by comparing the status information in the master. Interrupt requests may be lost if this rule is not observed; however, it is ensured that too many interrupt requests never occur, which in one embodiment may be achieved by a time interval having a minimum length to be set being provided between two interrupt requests from a first user to a second user, whereby the time interval may be a function, for example, of the number of users of the communication system and/or a length of frames.

In addition to the transmission of interrupt requests, the empty frames are utilized for configuring the slaves during continuous operation of the communication system. As previously mentioned, for security-critical applications, encoding with and/or via a cyclic redundancy check (CRC) may be carried out over the frames designed as data frames, for example. To prevent incorrect addressing of the users due to a transmission error, a CRC computation may likewise be carried out for an address header, and accordingly for a data header of an address of a frame, a check sum being computed for the address header, and a user using its address.

In one embodiment, each user, usually each slave, is assigned its address via an empty frame. As a result, however, each user in the ring-shaped communication system has knowledge of its absolute address, and may use same for the CRC computation. For this purpose, the master transmits the empty frame having an address field to which an address value 0x00 is assigned. Each slave subtracts the value 0x01 from the address value and negates the received address. Thus, with each receipt of an empty frame, the slave receives information concerning its position in the ring. The position of a receiving slave is typically a function of the particular address value in the address field, which provides information concerning how many subtractions of the address value have already been carried out, the number of subtractions corresponding to the number of slaves situated in the communication system which precede the receiving slave, i.e., after the master and before the receiving slave.

In another application, the identity bits of a frame of a data packet are configured by the master in such a way that one of the identity bits is interpreted by the slaves as a so-called toggle bit. In one example of a configuration, the toggle bit is described by second identity bit FD1 of the frame. In the event of a transmission error, the master may make a new request for a data packet with the aid of second identity bit FD1 of the frame, which is defined as a toggle bit. It is generally provided that a transmission error is detected based on an evaluation of a check sum of a cyclic redundancy check. A retransmit of the incorrectly transmitted data packet and/or of a correspondingly incorrectly transmitted message is initiated in the master autonomously, i.e., without interaction with a central processing unit (CPU). After the new transmission of a previously transmitted preceding data packet by the master, the slave identifies whether this is a repetition of the previous request, or a new message with comparable content. For this purpose, toggle bit FD1 is appropriately modified by the master. If the toggle bit of an incoming message for the previous cycle has not changed, it is provided that the slave once again transmits the previous data packet. Conversely, if toggle bit FD1 is modified by switching, the slave processes the present data packet, and concurrently with this present data packet, receives an acknowledgment of the successful transmission of the previous data packet to the master.

In the method for transmitting frames containing data between users of a ring-shaped communication system 50 having a master 52 and at least one slave 54, 56, 58, 60 as users, each user has at least one interrupt register 62, 64, 66. One field of the at least one interrupt register 62, 64, 66 is associated with an interrupt request, and includes a value for an interrupt bit. An interrupt request which includes the interrupt bit is transmitted to master 52 by a slave 54, 56, 58, 60 in a frame which is usually designed as an empty frame 42. In one embodiment of the method, it may be provided that in empty frame 42 an interrupt bit of this type is uniquely assigned to each slave 54, 56, 58, 60. It is also possible for frames which are designed as data frames 28, 116 to have one interrupt bit for each of slaves 54, 56, 58, 60. Empty frame 42, but also each data frame 28, 116 and thus typically each frame, may also have a toggle bit for all slaves 54, 56, 58, 60 which indicates a state of the transmitted frame, and thus also of an interrupt request transmitted in an empty frame 42. It may usually be signaled by a value of the toggle bit as to whether the preceding frame has been transmitted without errors, or whether an error has occurred during the transmission due to interference, for example.

Each slave 54, 56, 58, 60 generally has an interrupt register 62, a value of an interrupt bit of interrupt register 62 being inverted by slave 54, 56, 58, 60 when an interrupt request occurs. An instantaneous value of the field of interrupt register 62 may be inserted by slave 54, 56, 58, 60 into the frame, which is usually designed as an empty frame 42 or optionally as a data frame 28, 104, and transmitted to master 52. An xth slave 54, 56, 58, 60 transmits the value of its interrupt bit into an xth field of the frame which is uniquely assigned to xth slave 54, 56, 58, 60. As soon as master 52 receives a frame having updated fields for values of interrupt bits, these may be transferred into first interrupt register 64 of master 52.

It is also possible for master 52 to have two interrupt registers 64, 66, an xth field of a first interrupt register 64 including an interrupt bit for indicating the presence or non-presence of an interrupt request by an xth slave 54, 56, 58, 60 of a previous cycle, and an xth field of a second interrupt register 66 including an interrupt bit for indicating the presence or non-presence of an interrupt request by xth slave 54, 56, 58, 60 of an instantaneous cycle. The presence of an interrupt request may be established by master 52 by analyzing or comparing the two interrupt registers 64, 66, processing of interrupt requests being prioritized by master 52.

In addition, via empty frame 42 which includes the interrupt request, master 52 is signaled by the at least one slave 54, 56, 58, 60 that a data packet having a frame designed as a data frame 28 is to be picked up from slave 54, 56, 58, 60. The master is signaled as to whether or not an xth slave 54, 56, 58, 60 has triggered such an interrupt request via a value of the interrupt bit in the xth field of the empty frame. Depending on the definition, the presence of an interrupt request may be indicated by the value 1 or 0 of the interrupt bit of xth slave 54, 56, 58, 60.

The toggle bit in the frame, which is usually designed as an empty frame 42 and/or as a data frame 28, 104, is inverted by master 52 during an error-free transmission, a value of the toggle bit in the frame being maintained when there is interference in the preceding transmission, and for an unchanged toggle bit, slave 54, 56, 58, 60 once again transmitting a previous frame which is designed as a data frame 28, 104 and/or as an empty frame 42 and which includes the data to be transmitted or a message to be transmitted. Each frame generally has only one toggle bit of this type for all users, which documents a state of a transmission of the particular frame.

Interrupt requests in slave 54, 56, 58, 60 usually occur more slowly than interrupt requests in empty frame 42 are picked up. An interrupt request may be transmitted unidirectionally.

What is claimed is:

1. A method for transmitting frames containing data between users of a ring-shaped communication system having a master and at least one slave as users, each user having at least one interrupt register, comprising:
    associating one field of the at least one interrupt register with an interrupt request, the field including a value for an interrupt bit; and
    transmitting an interrupt request that includes the interrupt bit to the master by a slave in a frame configured as an empty frame, the empty frame including a toggle bit for all of the at least one slave which indicates a state of the interrupt request, wherein each of the at least one slave has an interrupt register; and
    inverting a value of an interrupt bit of the interrupt register by the at least one of the slave when the interrupt request occurs.

2. The method as recited in claim 1, further comprising:
    inserting an instantaneous value of the field of the interrupt register into the empty frame; and
    transmitting the instantaneous value to the master by the slave.

3. A method for transmitting frames containing data between users of a ring-shaped communication system having a master and at least one slave as users, each user having at least one interrupt register, comprising:
    associating one field of the at least one interrupt register with an interrupt request, the field including a value for an interrupt bit; and
    transmitting an interrupt request that includes the interrupt bit to the master by a slave in a frame designed as an empty frame, the empty frame including a toggle bit for all of the at least one slave which indicates a state of the interrupt request;
    wherein the master has two interrupt registers, an xth field of a first interrupt register including an interrupt bit for indicating a presence of an interrupt request by an xth slave of a previous cycle, and an xth field of a second interrupt register including an interrupt bit for indicating a presence of an interrupt request by the xth slave of an instantaneous cycle.

4. The method as recited in claim 3, wherein the presence of the interrupt requests is established by analysis of the two interrupt registers by the master, processing of interrupt requests being prioritized by the master.

5. A method for transmitting frames containing data between users of a ring-shaped communication system having a master and at least one slave as users, each user having at least one interrupt register, comprising:
    associating one field of the at least one interrupt register with an interrupt request, the field including a value for an interrupt bit; and transmitting an interrupt request that includes the interrupt bit to the master by a slave in a frame designed as an empty frame, the empty frame including a toggle bit for all of the at least one slave which indicates a state of the interrupt request;

wherein via the empty frame which includes the interrupt request, the master is signaled by the at least one slave that a data packet having a frame designed as a data frame is to be picked up from the slave by setting an interrupt bit which is assigned to the at least one slave in the empty frame.

6. A method for transmitting frames containing data between users of a ring-shaped communication system having a master and at least one slave as users, each user having at least one interrupt register, comprising:

associating one field of the at least one interrupt register with an interrupt request, the field including a value for an interrupt bit;

transmitting an interrupt request that includes the interrupt bit to the master by a slave in a frame designed as an empty frame, the empty frame including a toggle bit for all of the at least one slave which indicates a state of the interrupt request;

inverting the toggle bit in one of the empty frame and a data frame by the master during an error-free transmission; and maintaining a value of the toggle bit in one of the empty frame and the data frame when there is interference in the transmission, for an unchanged toggle bit, the slave once again transmitting one of a preceding empty frame and a data frame which includes a message.

7. A method for transmitting frames containing data between users of a ring-shaped communication system having a master and at least one slave as users, each user having at least one interrupt register, comprising:

associating one field of the at least one interrupt register with an interrupt request, the field including a value for an interrupt bit;

transmitting an interrupt request that includes the interrupt bit to the master by a slave in a frame designed as an empty frame, the empty frame including a toggle bit for all of the at least one slave which indicates a state of the interrupt request; and transmitting an interrupt request unidirectionally, wherein the toggle bit is not reset in the slave after processing by the master.

8. A ring-shaped communication system, comprising:
a master; and
at least one slave, which is a user, the user transmitting frames containing data to another user, each of the users having at least one interrupt register, one field of the at least one interrupt register being associated with an interrupt request and including a value for an interrupt bit, wherein an interrupt request which includes the interrupt bit is transmitted to the master by the at least one slave in a frame configured as an empty frame, the empty frame having a toggle bit for all of the at least one slave which indicates a state of the interrupt request;

wherein a value of an interrupt bit of the interrupt register by the at least one slave is inverted when the interrupt request occurs.

9. The system as recited in claim 8, wherein an instantaneous value of the field of the interrupt register is inserted into the empty frame, and wherein the instantaneous value is transmitted to the master by the at least one slave.

* * * * *